United States Patent [19]

Aonuma et al.

[11] 4,253,886

[45] Mar. 3, 1981

[54] CORROSION RESISTANT FERROMAGNETIC METAL POWDERS AND METHOD OF PREPARING THE SAME

[75] Inventors: Masashi Aonuma; Yasuo Tamai, both of Odawara, Japan

[73] Assignee: Fuji Photo Film Co., Ltd., Ashigara, Japan

[21] Appl. No.: 822,864

[22] Filed: Aug. 8, 1977

Related U.S. Application Data

[63] Continuation of Ser. No. 634,103, Nov. 21, 1975, abandoned.

[30] Foreign Application Priority Data

Nov. 21, 1974 [JP] Japan ................. 49-134467

[51] Int. Cl.³ .............................................. H10F 1/02
[52] U.S. Cl. ................................ 148/105; 252/62.51; 422/9; 427/127; 148/31.5
[58] Field of Search ................ 75/0.5 AA; 148/105, 148/31.5; 21/2.5 R, 2.5 B, 2.7 R; 427/127, 130, 132; 252/62.51, 62.54, 62.55

[56] References Cited

U.S. PATENT DOCUMENTS

| | | | |
|---|---|---|---|
| 2,318,606 | 5/1943 | Goebel et al. | 148/31.5 |
| 2,943,909 | 7/1960 | Wachter et al. | 21/2.5 B |
| 2,956,889 | 10/1960 | Denman | 21/2.5 B |
| 3,260,538 | 7/1966 | Gardner | 21/2.5 B |
| 3,871,823 | 3/1975 | Skicdum | 21/2.5 B |
| 3,891,470 | 6/1975 | Kotone et al. | 148/31.5 |
| 3,895,170 | 7/1975 | Tanaka et al. | 148/31.5 |
| 3,929,658 | 12/1975 | Beske | 252/62.54 |
| 3,964,939 | 6/1976 | Chandross et al. | 148/105 |
| 3,966,510 | 6/1976 | Aonuma et al. | 148/105 |

FOREIGN PATENT DOCUMENTS 40-261265 2/1965 Japan .

*Primary Examiner*—L. Dewayne Rutledge
*Assistant Examiner*—John P. Sheehan
*Attorney, Agent, or Firm*—Sughrue, Rothwell, Mion, Zinn and Macpeak

[57] ABSTRACT

Corrosion resistant ferromagnetic metal powders in which a volatile corrosion inhibitor is adsorbed on at least a part of the surface of ferromagnetic metal powders having an average particle size of 1000 Å or less are disclosed. A method of preparing the corrosion resistant ferromagnetic metal powders is also disclosed.

76 Claims, No Drawings

CORROSION RESISTANT FERROMAGNETIC METAL POWDERS AND METHOD OF PREPARING THE SAME

This is a continuation of application Ser. No. 634,103, filed Nov. 21, 1975, now abandoned.

BACKGROUND OF THE INVENTION

1. Field of the Invention

This invention relates to ferromagnetic metal powders and to a method of preparing the same. More particularly, this invention relates to ferromagnetic metal powders which are used for a magnetic recording medium suitable for high density recording and to a method of preparing the same.

2. Description of the Prior Art

Ferromagnetic powders such as $\gamma$-$Fe_2O_3$, Co-containing $\gamma$-$Fe_2O_3$, $Fe_3O_4$, Co-containing $Fe_3O_4$ or $CrO_2$ have hitherto been used for a magnetic recording medium. However, these ferromagnetic powders are not suitable for magnetic recording of a signal having a short recording wavelength (about 10 microns or less), i.e., their magnetic characteristics such as coercive force (Hc) and maximum residual magnetic flux density (Br) are insufficient for use in high density recording. In recent years, extensive efforts have been made to obtain ferromagnetic powders having characteristics suitable for high density recording. Ferromagnetic metal powders are one material which have been the object of such research. The metals mostly used include iron, cobalt and nickel, and, if desired, others such as chromium, manganese, zinc or rare earth elements are added.

The following methods of producing ferromagnetic metal powders are known.

(1) Thermally decomposing an organic acid salt of a ferromagnetic metal and then reducing with a reducing gas (as described, e.g., in Japanese Patent Publication Nos. 11,412/61, 22,230/61, 14,809/63, 3,807/64, 8,026/65, 8,027/65, 15,167/65, 16,899/65 (U.S. Pat. No. 3,186,829), 12,096/66, 14,818/66 (U.S. Pat. No. 3,190,748), 24,032/67, 3,221/68, 22,394/68, 29,268/68, 4,471/69, 27,942/69, 38,755/71, 38,417/72, 41,158/72, 29,280/73, etc.).

(2) Reducing needle-like oxyhydroxides, needle-like oxyhydroxides having a metal contained therein, or needle-like iron oxide obtained from these oxyhydroxides (as described, e.g., in Japanese Patent Publication Nos. 3,862/60, 11,520/62, 20,335/64, 20,939/64, 24,833/71, 29,706/72, 30,477/72 (U.S. Pat. No. 3,598,568), 39,477/72 and 24,952/73, Japanese Patent Laid-Open Application Nos. 5,057/71, 7,153/71, 79,153/73 and 82,395/73, U.S. Pat. Nos. 3,607,220 and 3,702,270, etc.).

(3) Evaporating a ferromagnetic metal in an inert gas under low pressure (as described, e.g., in Japanese Patent Laid-Open Application Nos. 25,620/71, 4,131/72, 27,718/72, 25,662/73, 25,663/73, 25,664/73, 25,665/73, 31,166/73, 55,400/73 and 81,092/73, etc.).

(4) Thermally decomposing a metal carbonyl compound (as described, e.g., in Japanese Patent Laid-Open Application Nos. 1,004/64, 3,415/65 and 16,868/70, U.S. Pat. Nos. 2,983,997, 3,172,776, 3,200,007 and 3,228,882, etc.).

(5) Electrodepositing ferromagnetic metal powders using a mercury cathode and then separating the powder from mercury (as described, e.g., in Japanese Patent Publication Nos. 12,910/60, 3,850/61, 5,513/61, 787/64, 15,525/64, 8,123/65, 9,605/65 (U.S. Pat. No. 3,198,717) and 19,661/70 (U.S. Pat. No. 3,156,650), U.S. Pat. No. 3,262,812, etc.).

(6) Adding a reducing agent to a solution containing a salt of a ferromagnetic metal to reduce the salt (as described, e.g., in Japanese Patent Publication Nos. 20,520/63, 26,555/63, 20,116/68, 9,869/70, 14,934/70, 7,820/72, 16,052/72, 41,718/72 and 41,719/72 (U.S. Pat. No. 3,607,218), Japanese Patent Laid-Open Application Nos. 1,353/72 (U.S. Pat. No. 3,756,866), 1,363/72, 42,252/72, 42,253/72, 44,194/73, 79,754/73, 82,396/73 and 41,899/74, U.S. Pat. Nos. 3,206,338, 3,494,760, 3,535,104, 3,567,525, 3,661,556, 3,663,318, 3,669,643, 3,672,867 and 3,726,664, etc.).

This invention is concerned with ferromagnetic powders obtained by the afore-said various methods, and particularly concerned with an after-treatment of ferromagnetic metal powders obtained by the above method (6) which comprises reducing a salt of a ferromagnetic metal in solution.

In general, the ferromagnetic metal powders obtained by the above method (6) are treated, for example, in such a manner that they are separated from the reaction mother liquid, washed with water to remove unreacted metal ions and anions such as $SO_4^{--}$ and $Cl^-$, and then subjected to a solvent exchange or dried in an inert gas (in a non-oxidizing atmosphere). The ferromagnetic metal powders obtained by these procedures have the following disadvantages: the ferromagnetic metal powders are poor in magnetic stability. Particularly, they are so unstable to moisture that they are gradually oxidized even at ambient temperatures in the presence of moisture. For example, powders consisting of Fe as a main component often lose their magnetic properties. Therefore, in an after-treatment step after reduction, oxidation gradually proceeds, and thus the ferromagnetic metal powders are liable to lose their high Bm property, one of their excellent features.

Various research have been performed to eliminate the above defect.

For example, the addition of a non-magnetic element to the reaction solution to impart oxidation resistance to the composition is described in U.S. Pat. Nos. 3,535,104, 3,669,643 and 3,672,867, Japanese Patent Publication Nos. 7,820/72 and 20,520/63, Japanese Patent Application Nos. 128,988/73 and 12,898/73, etc.

Moreover, the addition of an organic compound to a reaction bath is described in Japanese Patent Publication Nos. 20,116/68, 14,934/70, 41,719/72 (U.S. Pat. No. 3,607,218) and 7,820/72, Japanese Patent Laid-Open Application Nos. 42,253/72, 44,194/72, 79,754/73 and 82,396/73, etc.

In addition, there is known adding a higher aliphatic acid in the reaction step as described in Japanese Patent Publication No. 20,116/68, adding a compound having a sulfone group on the aromatic ring in the reaction step as described in Japanese Patent Publication No. 14,934/70, and adding a surface active agent in the reaction step as described in Japanese Patent Publication No. 7,820/72.

In any of the above methods, a surface active agent or the like is added to a reaction bath in the reaction step, but it was found that when the reaction was carried out by adding such materials in an amount sufficient to improve Bm and oxidation resistance, ferromagnetic metal powders having a high coercive force and high squareness ratio (Br/Bm) could not be obtained. In other words, when the reaction was carried out by adding a surface active agent or the like to the reaction bath, ferromagnetic metal powders having high Bm and good oxidation resistance could not be obtained without deteriorating magnetic characteristics (coercive force and squareness ratio).

We have studied various approaches of preventing oxidation in an aftertreatment step after a reduction reaction, and as a result, found that oxidation was highest in a washing step. We thus proposed a method of washing with an aqueous solution containing sacchrin, an aqueous solution containing a reducing substance, an aqueous solution containing an anionic surface active agent, or the like, as disclosed in Japanese Patent Application Nos. 10,441/74, 11,678/74 and 106,901/74.

Japanese Patent Publication 2,612/65 discloses a method of incorporating a volatile corrosion inhibitor into a magnetic layer or a backing layer for the prevention of corrosion of a magnetic metal thin film or a magnetic alloy powder tape.

In the above method, the volatile corrosion inhibitor is used together with a binder and magnetic powders. However, according to later made detailed investigations, it was found that an anticorrosive compound shows much more effect when added immediately after the reaction producing the magnetic powders, i.e., in the step of washing the surface of the magnetic powders, than when added during kneading the magnetic powders.

SUMMARY OF THE INVENTION

This invention is characterized by treating ferromagnetic metal powders obtained through an oxidation-reduction reaction using an aqueous solution containing a volatile corrosion inhibitor for washing the powders, treating the powders using an organic solvent containing a volatile corrosion inhibitor, treating the powders in an atomsphere containing a volatile corrosion inhibitor, or treating the powders by a combination of the above.

It is a first object of this invention to provide a method of preventing ferromagnetic metal powders from being oxidized in the production thereof.

It is a second object of this invention to provide ferromagnetic metal powders having excellent moisture resistance.

It is a third object of this invention to provide ferromagnetic powders having excellent dispersibility in a binder.

It is a fourth object of this invention to provide a method of after-treatment after a reduction reaction in a short time, which can produce ferromagnetic powders that can be stored for long periods, and which is advantageous for the bulk treatment of ferromagnetic powders.

It is a fifth object of this invention to provide ferromagnetic metal powders having magnetic stability with the passage of time.

It is a sixth object of this invention to provide ferromagnetic metal powders having excellent characteristics as a magnetic recording medium for high density recording.

It is a seventh object of this invention to provide magnetic powders which can be used for a permanent magnet, magnet core, magnetic fluid, and the like.

Volatile corrosion inhibitors (hereafter often a VCI) are well known, and VCI papers and VCI films prepared by coating the volatile corrosion inhibitor on papers or films or impregnating papers or films with the volatile corrosion inhibitor have been put into practical use. Moreover, for the temporary prevention of corrosion of steel pieces and the like, an aqueous solution, an oil, and the like, to which the volatile corrosion inhibitor has been added have been used. This invention utilizes such volatile corrosion inhibitors for the treatment of magnetic metal powders.

By treating ferromagnetic metal powders with a volatile corrosion inhibitor, the saturation magnetization magnetic moment ($\sigma s$) per unit weight of the ferromagnetic metal powders is not deteriorated. Moreover, the ferromagnetic powders show a good state of dispersion in a binder, probably attributable to the adsorption of the volatile inhibitor on the surface of each particle, and an improvement in squareness ratio (Br/Bm) is observed in using the ferromagnetic metal powders for a magnetic recording medium.

In addition, synergistic effects are suprisingly obtained using the volatile corrosion inhibitor together with an anionic surface active agent in a process for producing a ferromagnetic metal powder by a solution reduction process using an aqueous solution containing at least one surface active agent (see U.S. Patent Application Ser. No. 614,274, filed Sept. 17, 1975 and now U.S. Pat. No. 4,063,000), or by treating the ferromagnetic metal powders having a volatile corrosion inhibitor adsorbed thereon with an anionic surface active agent. As such synergistic effects, there have been seen, for example, an improvement in dispersibility in a binder, a slight reduction in the $\sigma s$ of the powders per se, even in an atmosphere of high temperature and high humidity (e.g., 60° C. and 90% RH), etc.

It has been found that ferromagnetic metal powders having a volatile corrosion inhibitor adsorbed on their surface eliminate the defects of conventional ferromagnetic metal powders, viz: a lowering of $\sigma s$ during storage is prevented, dispersibility in a binder is satisfactory, a good squareness ratio (Br/Bm) is obtained using the ferromagnetic powders as a magnetic recording medium, deterioration of the magnetic recording medium in an atmosphere of high temperature and high humidity is minimized, and the like.

The effects of this invention can be attained more completely when a volatile corrosion inhibitor is adsorbed so as to cover the entire surface of the ferromagnetic metal powders, but the effects are sufficiently attainable even with a partial adsorption of the volatile corrosion inhibitor on the surface, e.g., with more than about 0.005 wt.% of the volatile corrosion inhibitor, based on the weight of the powder.

DETAILED DESCRIPTION OF THE INVENTION

Volatile corrosion inhibitors which are effectively used in this invention are organic compounds or derivatives thereof (such as inorganic acid salts or organic acid salts) containing at least one nitrogen atom (N), preferably 1 to 4 nitrogen atoms, and having a molecular weight ranging from about 50 to about 200 and having about 1 to 12 carbon atoms.

In particular, for preventing deterioration of the $\sigma s$ in processing, those volatile corrosion inhibitors having a high vapor pressure are effective (preferably more than about $1 \times 10^{-2}$ mmHg, most preferably above $1 \times 10^{-2}$ to $1 \times 10^2$ mmHg at 20° C.), but since their effect decreases in a short time, they are used in combination with volatile corrosion inhibitors having a low vapor pressure (preferably less than about $1 \times 10^{-2}$ mmHg, most preferably from $0.1 \times 10^{-5}$ to less than $1 \times 10^{-2}$ mmHg at 20° C.). However, even when they are used alone, the effects of this invention are sufficiently attained.

VCI's having a vapor pressure of about $0.1 \times 10^{-5}$ mmHg to about 100 mmHg at a temperature ranging from 15° to 25° C. can be use alone, of course. If the vapor pressure is lower than the above range, the evaporation rate is low, so that the rapid development of the effect is hindered. On the other hand, with a vapor pressure higher than the above range, the evaporation rate is high, and, therefore, the effect is lost in a short time, which is unfavorable for practical purposes.

Examples of high vapor pressure materials include those such as cyclohexyl ammonium carbonate, diisopropylamine nitrite, guanidine carbonate, etc., and examples of low vapor pressure materials include those such as dicyclohexylamine nitrite, dicyclohexylamine chromate, hexamethylenetetramine, etc.

Examples of volatile corrosion inhibitors are inorganic or organic acid salts of hydrocarbons containing at least one nitrogen atom (N) in the form of an amine or imine, i.e., amine, amide, imide and other aliphatic (straight or branches cyclic, heterocyclic or aromatic series materials. The amine moiety can be present in the form of an amino group, an amido group, an imido group, or the like.

Specific examples of the above amines are primary amines and secondary amines, which are readily available and are used advantageously, such as ammonia, methylamine, dimethylamine, ethylamine, methylethylamine, dimethylamine, propylamine, diisopropylamine, butylamine, sec-butylamine, pentylamine, hexylamine, cyclohexylamine, dicyclohexylamine, heptylamine, ethylhexylamine, octylamine, decylamine, benzylamine, methoxybenzylamine, cyclohexylhydroxylamine, phenetylamine, phenoxyethylamine, phenoxypropylamine, 3-phenylpropylamine, methoxyethylamine, 2-(2-methoxyethoxy)ethylamine, dimethylaminoethylamine, diethylaminoethylamine, N-methylanilioethylamine, nitronaphthylamine, aniline, toluidine, anisidine, nitroaniline, dimethylaminoaniline, methylbutylamine, nonylamine, undecylamine, dicyandiamine, alanine, aminoethylpyridine, aminoethylmorpholine, aminoethylbenzene, aminopropylmorpholine, stearylamine, 4-aminobutyric acid, aminoethylquinoline, aminofluorenone, allylamine, aminopropylpyrrolidone, butoxyethylamine, chlorobenzylamine, heptadecylamine, ethylenediamine, propylenediamine, diaminobutane, hexamethylenediamine, octylenediamine, diaminodiphenylmethane, xylylenediamine, piperazine, methylpiperazine, 2,5-dimethylpiperazine, dimethylethylenediamine, dimethylbutylenediamine, dimethylhexamethylenediamine, dimethylxylylenediamine, diethylxylylenediamine, $\alpha,\alpha,\alpha',\alpha'$-tetramethyl-p-xylylenediamine, N-n-butyldiethanolamine, monoethanolamine, diethanolamine, triethanolamine, diisopropanolamine, N-ethyldiethanolamine, N,N'-bis-($\gamma$-aminopropyl)-methylamine, N,N'-dimethyl-N,N'-bis($\gamma$-aminopropyl)ethylenediamine, N,N'-bis($\gamma$-aminopropyl)-piperazine, N,N'-bis-($\gamma$-aminopropyl)-2,5-dimethylpiperazine, N-(3-aminopropyl)-diethanolamine, bis-N,N-($\beta$-hydroxyethyl)-methylamine, bis-N,N'-($\gamma$-hydroxypropyl)-methylamine, N,N'-dimethyl-N,N'-bis-($\beta$-hydroxyethyl)-ethylenediamine, N,N'-dimethyl-N,N'-bis-($\gamma$-hydroxypropyl)-ethylenediamine, N,N'-bis($\beta$-hydroxypropyl)-piperazine, N,N'-bis-($\alpha$-hydroxyethyl)-piperazine and N,N'-bis-($\beta$-hydroxyethyl)-piperazine.

Specific examples of amides are dimethylformamide, diethylformamide, formamide, diethylacetamide, morpholine, formylmorpholine, dimethylacetamide, hexamethylphosphoramide, urea, tetramethylurea, acrylamide, N-substituted acrylamide (e.g., methylacrylamide, ethylacrylamide, propylacrylamide, isopropylacrylamide, butylacrylamide, t-butylacrylamide, heptylacrylamide, t-octylacrylamide, cyclohexylacrylamide, benzylacrylamide, hydroxymethylacrylamide, methoxyethylacrylamide, dimethylaminoacrylamide, hydroxyethylacrylamide, phenylacrylamide, hydroxyphenylacrylamide, tolylacrylamide, naphthylacrylamide, dimethylacrylamide, diethylacrylamide, dibutylacrylamide, diisobutylacrylamide, diacetonacrylamide, methylbenzylacrylamide, benzyloxyethylacrylamide, $\beta$-cyanoethylacrylamide, acryloylmorpholine, N-methyl-N-acryloylpiperazine, N-acryloylpiperidine, acryloylglycine, N-(1,1-dimethyl-3-hydroxybutyl)-acrylamide, N-$\beta$-morpholinoethylacrylamide, N-acryloylhexamethyleneimine, N-hydroxyethyl-N-methylacrylamide, N-2-acetamidoethyl-N-acetylacrylamide, etc.), methacrylamide and N-substituted methacrylamide (e.g., methylmethacrylamide, t-butylmethacrylamide, t-octylmethacrylamide, benzylmethacrylamide, cyclohexylmethacrylamide, phenylmethacrylamide, dimethylmethacrylamide, diethylmethacrylamide, dipropylmethacrylamide, hydroxyethyl-N-methylmethacrylamide, N-methyl-N-phenylmethacrylamide, N-ethyl-N-phenylmethacrylamide, etc.).

Specific examples of the imides include guanidine (iminourea), guanylurea (dicyandiamidine), cyanguanidine (dicyandiamide), succinimide, glutarimide, phthalimide, acetonitrile, ethyleneimine, pyrrolidine and piperidine.

The volatile corrosion inhibitors of this invention are inorganic acid salts or organic acid salts of the above amines, amides or amides. The inorganic acid salts include the nitrate, nitrite, picrate, sulfate, sulfide, chlorite, hydrochloride, perchloride, phosphate, carbonate, chromate and sulfonate. The organic acid salts include the formate, propionate, caprylate, laurate, stearate, oxalate, succinate, adipate, benzoate, benzenesulfonate, phthalate, carbamate, etc.

Specific examples of volatile corrosion inhibitors of this invention are dicyclohexylamine nitrite, dicyclohexylamine caprylate, dicyclohexylamine carbamate, dicyclohexylamine chromate, cyclohexylamine carbonate, cyclohexylamine nitrite, cyclohexylamine formate, cyclohexylamine adipate, cyclohexylamine chromate, diisopropylamine nitrite, monoethanolamine benzoate, monoethanolamine phthalate, diethanolamine phosphate, diethanolamine sulfonate, triethanolamine nitrite, hexylmethylenediamine caprylate, cyclohexylhydroxylamine chromate, dicyandiamine nitrite, nitronaphthylamine nitrite, hexamethylenediamine carbonate, propylenediamine stearate, xylylenediamine propionate, piperazine caprylate, morpholine laurate, morpholine stearate, guanidine carbonate, guanidine nitrate, guanidine propionate, guanidine hydrochloride, guanidine chromate, guanidine sulfate and guanidine picrate.

The above volatile corrosion inhibitors may be used alone or as a mixture thereof, or may be used together with other known corrosion inhibitors such as phosphoric acid, sulfamide; amines such as guanidine, pyridine, amine, urea; chromates such as zinc chromate, calcium chromate and strontium chromate; an alkali such as sodium nitrite, sodium nitrate, sodium phosphinate, sodium sulfonate and sodium chromate. Typically a ratio of 0–200 wt.% based on the VCI is used.

The volatile corrosion inhibitors of this invention can also be used in the form of a solution. In this case, they are dissolved in water, a solvent miscible with water, or water and one or more such solvents.

Solvents miscible with water which are used in this invention include solvents miscible in an amount of at least 20 wt. % or more, based on total of water plus solvent, e.g., alcohols such as methanol, ethanol, propanol and isopropanol; ketones such as acetone and methyl ethyl ketone; etc.

The effective concentrations of the volatile corrosion inhibitor in a liquid phase system is 0.005 wt. % or more based on the total system weight. The upper limit thereof can be as high as the saturation concentration in each case. With less than 0.005 wt. % based on the total system weight, in particular, the $\sigma s$ of the ferromagnetic metal powders is not improved. Usually, the volatile corrosion inhibitors are used in concentrations of 0.01 to 20 wt. % based on the total system weight. When used as an aqueous solution, they are preferably used at a pH of about 5 to about 9 (for example, in the case of using dicyclohexylamine nitrite, since the nitroso compound is liberated under acidic conditions, and amine is liberated under basic conditions).

The temperatures employed are preferably about 120° C. or less, and usually about ambient temperature is used because of easy operation. Temperatures more than about 120° C. are unfavorable since the volatile corrosion inhibitor may evaporate. The pressure employed is, in practice, in the range of about 0.5 to about 5 atm. The contact time of the volatile corrosion inhibitor is generally at least about 1 minute, preferably at least 5 minutes. There is no upper limit upon the time of contact with the volatile corrosion inhibitor, but as will be appreciated by one skilled in the art, for efficient processing it is most preferred to utilize as low a contact time as possible commensurate with achieving the effects of the volatile corrosion inhibitor.

In the situation wherein a gaseous volatile corrosion inhibitor system is utilized, most preferably the volatile corrosion inhibitor is present in an amount of from about 10 g to about 2 Kg/m$^3$ of the treating atmosphere. The temperature, pressure and time used are same as those for the liquid phase system.

The ferromagnetic metal powders used in this invention are prepared by one of the afore-said various methods, and one or more of the volatile corrosion inhibitors are adsorbed on to a substantial part of the surface, preferably the entire surface, of such ferromagnetic metal powders. Particularly effective ferromagnetic metal particles are of a spherical or needle-like shape, which have an average diameter of about 50 to about 1000 Å (needle-like particles generally comprise a plurality of spherical particles having an average diameter in the indicated range). As will thus be clear, the term "particle size" above refers to the direction in the minor axis when a plurality of the particles are joined together. Conventionally, from about 2 to about 20 spherical particles are connected, though this is by no means limitative on the present invention.

At least about 75% by weight, preferably 80% by weight, of the ferromagnetic metal powder is a metal. At least about 80% by weight of the metal comprises, i.e., Fe, Fe-Co, Fe-Ni, Co-Ni, and Fe-Co-Ni as the major component. In addition to these metals, about 20% by weight or less, preferably 0.5 to 5% by weight, of one or more of Al, Si, S, Sc, Ti, V, Cr, Mn, Zn, Y, Mo, Rh, Pd, Ag, Sn, Sb, Te, Ba, Ta, W, Re, Au, Hg, Pb, Bi, La, Ce, Pr, Nd, B, P and the like are present, if necessary in order to improve the properties of the ferromagnetic metal powder. For example, where a boron hydride compound is used as the reducing agent, in a preferred example the metal comprises 80% by weight or more of the ferromagnetic metal powder, and the metal comprises about 68 to 89% by weight of iron, about 7 to 34% by weight of cobalt, and about 0.5 to 5% by weight of chromium. The remainder comprises water, hydroxides, oxides, and the like.

Examples of preferred compositions for ferromagnetic alloy powders of the above components are as follows: Fe-Co-Cr-B, Fe-Co-Ti-B, Fe-Co-Pb-B, Fe-Co-Sn-B, Fe-Co-Sb-B, Fe-Co-S-B, Fe-Ni-Cr-B, Fe-Ni-Ti-B, Fe-Ni-Pb-B, Fe-Ni-Sn-B, Fe-Ni-Sb-B, Fe-Ni-S-B, Co-Ni-Cr-P, Co-Ni-Ti-P, Co-Ni-Pb-P, Co-Ni-Sn-P, Co-Ni-Sb-P, Co-Ni-S-P, Co-Ni-Pd-P, Fe-Co-Ni-Cr-B, Fe-Co-Ni-Ti-B, Fe-Co-Ni-Pb-B, Fe-Co-Ni-Sn-B, Fe-Co-Ni-Sb-B, Fe-Co-Ni-S-B, Fe-Co-Ni-Cr-P, Fe-Co-Ni-Ti-P, Fe-Co-Ni-Pb-P, Fe-Co-Ni-Sn-P, Fe-Co-Ni-Sb-P, Fe-Co-Ni-S-P, which comprise at least one component from the following groups, respectively: (Fe, Co, Ni)+(Cr, Ti, Pb, Sn, Sb, S)+(B, P).

Such particles can easily be prepared by the method as described hereinbefore in paragraph (6) for the preparation of ferromagnetic metal powders. It is to be specifically noted that the process of the present invention involving the use of a volatile corrosion inhibitor can be applied to ferromagnetic particles obtained by any of processes (1) to (5) or (6) above. However, for reasons which are not yet entirely clear, unexpectedly superior results are obtained when the process of the present invention is applied to particles which are prepared by method (6) described above.

As earlier indicated, the present invention can be particularly effectively applied to those ferromagnetic metal powders produced by method (6) in which a metal salt capable of forming a ferromagnetic metal powder is reduced in a solution thereof.

More specifically, those ferromagnetic metal powders produced by reducing a metal salt capable of forming a ferromagnetic metal powder with, as a reducing agent, an acid containing a phosphinate (hypophosphite ion) ion or a salt thereof; a boron hydride compound such as sodium borohydride, diethylamine borane, methyl diborane, and the like or the derivatives thereof; hydrazine and its derivatives; and metal powders such as Mg, Ca, Al, etc., can be used. If a phosphinic acid ion-containing acid or a salt thereof is used as the reducing agent, phosphorus, P, is incorporated into the ferromagnetic metal powder formed in a proportion of about 0.1 to 10% by weight during the course of the reaction. In the case of the boron hydride compounds or the derivatives thereof, boron, B, is incorporated into the ferromagnetic metal powder in a proportion of about 0.1 to 10% by weight during the course of the reaction.

In accordance with one embodiment of the present invention, a ferromagnetic metal powder, e.g., a ferromagnetic metal powder obtained by effecting oxidation-reduction reaction using sodium borohydride as the reducing agent, is separated from the reaction solution, and the ferromagnetic metal powder so separated is, if the conductivity of the reaction solution is not more than 20 m$v$/cm, immediately, or if the conductivity is not less than 20 m $v$/cm, after reducing the conductivity to not more than 20 m $v$/cm by washing the ferromagnetic metal powder with water, treated with an aqueous solution containing one or more anionic surface active agents, for example, sodium oleate, to adsorb the surface active agent on the surface of the ferromagnetic metal powder. In effecting the treatment, it is important to disperse the ferromagnetic metal powder uniformly in the aqueous solution. Then, any excess of the sodium oleate is removed directly or by washing with water. In carrying out the replacement, it has been found that the replacement can be carried out in a short period of time if an organic solvent is used. In this case, it is effective to incorporate a reducing agent into the organic solvent.

In accordance with an even more effective embodiment of the invention, non-magnetic elements or organic compounds can be added to the metal salt having ferromagnetic properties or the oxidation-reduction system and the mixture so prepared reduced to produce a ferromagnetic powder having excellent resistance to oxidation and the like, whereafter the ferromagnetic powder is treated with a solvent containing one or anionic surface active agents.

Examples of non-magnetic elements as are mentioned above include Cr, Ti, Pb, Mn, Pt, As, Ca, Ge, Ta, Zn and the like, these disclosed in U.S. Pat. Nos. 3,535,104; 3,661,556, and 3,672,867; Japanese Patent Publication No. 20520/1963; and Japanese Patent Applications (OPI) No. 78896/1975 (corresponding to U.S. patent application Ser. No. 524,853, filed Nov. 18, 1974) and No. 78897/1975 (corresponding to U.S. patent application Ser. No. 524,860, filed Nov. 18, 1974).

When the amount of the ferromagnetic metal ions dissolved in the solution is 0.002 to 2.0 mol/liter, preferably from 0.01 to 0.5 mol/liter, the non-magnetic elements can be present in an amount of 0.0 to 15.0 mol%, preferably 0.0 to 5.0 mol%, based on the ferromagnetic metal ions.

Examples of the organic compounds as are mentioned above (optionally present in the reaction solution) are fatty acids, aryl sulfonates, surface active agents, organic solvents, complexing agents, viscosity increasing agents, passivating agents, proteins, carbohydrates, and the like, such as those disclosed in U.S. Pat. Nos. 3,607,218 and 3,661,556; Japanese Patent Publication Nos. 20116/1968, 14934/1970 and 7820/1972; and Japanese Patent Applications (OPI) Nos. 42253/1972 (corresponding to U.S. Pat. No. 3,725,036), 79754/1973 (corresponding to U.S. patent application Ser. No. 326,358, filed Jan. 24, 1973 and now abandoned), 82396/1973 and 41756/1975 (corresponding to U.S. patent application Ser. No. 498,338, filed Aug. 19, 1974 and now abandoned.

Fatty acids, aryl sulfonates and surface active agents can be added in an amount of about 0.05 to 1.0 wt. %, preferably 0.06 to 0.7 wt.%, while organic solvent(s), complexing agent(s), and passivating agent(s) can be added in an amount of about 0.1 to 50 wt. %, proteins and carbohydrates can be added in an amount of about 0.5 to 10 wt. %, preferably 1.0 to 6.0 wt. %, and viscosity increasing agents can be added to increase the system viscosity to 2.0 cp or more, preferably 2.0 to 10.0 cp.

In accordance with the above highly preferred embodiment of the present invention, a ferromagnetic metal powder is obtained which has a coercive force of about 10 to 2000 Oe or more, a Bm value of about 80 emu/g or more (at Hm=2000 Oe), and a Br/Bm ratio of about 0.50 or more. It is possible to produce a ferromagnetic metal powder having a particle size of about 50 to 1000 Å in the direction of the minor axis, and furthermore, it is possible to produce a ferromagnetic metal powder whose particle size is spherical to needle-like (including a needle-like shape in which 2 to 20 spherical particles are connected).

It has proven to be undesirable that the volatile corrosion inhibitor be added to a reaction bath during oxidation-reduction reaction because of a deterioration of the magnetic characteristics thereof.

The volatile corrosion inhibitor should be adsorbed on the surface of each ferromagnetic metal particle after the production of the particles. In this regard, the present invention is directed to embodiments wherein ferromagnetic particles are treated with the volatile corrosion inhibitor(s) per se, particles treated with a combined layer of volatile corrosion inhibitor(s) and anionic surface active agent(s), ferromagnetic particles treated with an inner layer of the volatile corrosion inhibitor(s) and thereafter overcoated with anionic surface active agent(s), particles treated with an inner layer of anionic surface active agent(s) and thereover coated with a layer of the volatile corrosion inhibitor(s), and various combinations thereof.

More specifically, the surface of the ferromagnetic metal particles is treated by one or more of the following methods: the ferromagnetic metal powders obtained through oxidation-reduction are washed with water containing a volatile corrosion inhibitor(s); the ferromagnetic metal powders are washed with an organic solvent containing a volatile corrosion inhibitor(s); or the ferromagnetic metal powders are dried in an atmosphere containing a volatile corrosion inhibitor. The organic solvents used for the volatile corrosion inhibitors include ketones such as acetone, methyl ethyl ketone, methyl isobutyl ketone and cyclohexanone; alcohols such as methanol, ethanol, propanol and butanol; esters such as methyl acetate, ethyl acetate, butyl acetate, ethyl lactate and glycol monoethyl ether acetate; glycol ethers such as ether, glycol dimethyl ether, glycol monoethyl ether and dioxane; aromatic hydrocarbons such as benzene, toluene and xylene; chlorinated hydrocarbons such as methylene chloride, ethylene chloride, carbon tetrachloride, chloroform, ethylene chlorohydrin and dichlorobenzene; dimethyl sulfoxide, dimethylformamide, tetrahydrofuran, etc.

In each case, uniform adsorption on the surface of the particles can be obtained by means of ultrasonic dispersion, mixing with high shearing force, injection dispersion, and the like.

The ferromagnetic particles obtained by the aforesaid methods have the volatile corrosion inhibitor adsorbed on their surface. As will be appreciated by one skilled in the art, the amount of volatile corrosion inhibitor is influenced by the exact process utilized to deposit the same. However, it is preferred that from about 0.001 to about 100 volume %, most preferably 0.005 to about 50 volume % of the volatile corrosion inhibitor be present, based on the volume of the ferromagnetic powder. The adsorption of the volatile corrosion inhibitor on the ferromagnetic particles can be confirmed by the "spot test" for amines, nitrous acid, aliphatic acids, etc. (qualitative analysis). Quantitative analysis can be effected, e.g., by the method described in JIS-Z 1519.

The ferromagnetic metal powders which have the volatile corrosion inhibitor adsorbed on their surface are mixed with a binder and solvent to form a dispersion, coated on a support and then dried to form an excellent magnetic recording medium in the form of tape, disc, sheet, card, or the like.

Moreover, they can be used as a magnetic fluid after being treated with an anionic surface active agent such as sodium oleate.

The effects of this invention can, in part, be enhanced by a modification such as adding a non-magnetic element or an organic compound to a ferromagnetic metal salt and then carrying out the reduction reaction.

The ferromagnetic metal powders of this invention prepared by the simplest embodiments show a coercive force (Hc) of 1 to 2,000 Oe, a saturation magnetization ($\sigma s$) of more than 80 emu/g (at Hm=3000 Oe), and after standing in the atmosphere at 60° C. and 90% RH for 7 days, a $\sigma s$ of more than 70 emu/g. By several of the embodiments set out, even more highly preferred properties are obtained.

A magnetic recording medium suitable for high density recording was prepared using the ferromagnetic metal powders of this invention. The resulting medium had the characteristics: Hc ranging from 600 to 1500 Oe, Br/Bm more than 0.80 and [Br/Hc] ranging from 1.5 to 5.0 (expressing Hc in oersteds and Br in gauss).

Moreover, it has been found that synergistic effects are obtained by further treating the feromagnetic metal powders of this invention with an anionic surface active agent such as sodium oleate.

The anionic surface active agents used in this invention include those having a carboxylic acid in the hydrophilic group or a salt thereof, those having a salt of a sulfuric ester, those having a salt of a phosphoric ester, those having a salt of a dithiophosphoric ester, those having a salt of a sulfonic acid, etc. Such salts include the ammonium salt, alkali metal salts (such as Li, Na and K) and alkaline earth metal salts (such as Mg, Ca and Ba).

Specific examples are as follows.

(1) carboxylic acids or salts thereof; e.g., an aliphatic carboxylic acid having 6 to 23 carbon atoms, alkali metal salts or alkaline earth metal salts thereof.

(2) salts of sulfuric esters: a salt of a sulfuric ester of a higher alcohol having 6 to 18 carbon atoms, a salt of a sulfuric ester of an aliphatic acid having 6 to 32 carbon atoms, a salt of a sulfuric ester of an aliphatic ester having an alkyl group with about 1 to 4 carbon atoms in the ester moiety, a salt of a sulfuric ester of a polyoxyethylene alkyl ether [R(C$_2$H$_4$O)$_n$OSO$_3^-$, wherein R is alkyl group having 8 to 18 carbon atoms, and n is from 0 to 6, inclusive], a salt of a sulfuric ester of a polyoxyethylene phenyl ether

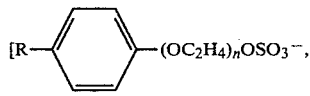

wherein R is an alkyl or alkenyl group containing about 8 to 18 carbon atoms, and n is an integer of 1 to 6, inclusive], a salt of a sulfuric ester of an oil, fat or wax, such as lin seed oil, sunflower oil, cotton seed oil, olive oil, castor oil, palm oil, tallow, palm wax, etc.

(3) salts of sulfonic acids: a salt of an alkylarylsulfonic acid, a salt of an amido-bond containing alkylarylsulfonic acid, a salt of an ether bond containing alkylarylsulfonic acid, a salt of an ester bond containing alkylarylsulfonic acid, a salt of an α-olefin sulfonic acid, a salt of an ether bond containing sulfonic acid, a salt of an amido bond containing sulfonic acid, an ester bond containing sulfonate, etc.

(4) salts of phosphoric esters: a salt of a phosphoric monoester of a higher alcohol having 6 to 18 carbon atoms, a salt of a diphosphoric ester, a salt of a phosphoric ester of an ethylene oxide - a higher alcohol adduct (the higher alcohol preferably having 6 to 18 carbon atoms), etc.

(5) salts of dithiophosphoric esters: a salt of a dialkyldithiophosphoric (where the alkyl group preferably has from 1 to 12 carbon atoms) ester (e.g., a zinc salt), etc.

Specific examples of the above compounds are salts of aliphatic acids having 6 to 32 carbon atoms such as sodium caproate, potassium enanthate, sodium caprylate, magnesium caprylate, sodium pelargonate, ammonium pelargonate, sodium caprinate, magnesium caprinate, sodium undecylate, magnesium undecylate, potassium undecylenate, barium undecylenate, sodium laurate, ammonium laurate, magnesium laurate, potassium lauroleate, magnesium lauroleate, sodium tridecanoate, potassium tridecanoate, sodium myristate, potassium myristate, ammonium myristate, magnesium myristate, sodium tsuzuate, ammonium tsuzuate, magnesium tsuzuate, sodium pentadecanoate, sodium palmitate, ammonium palmitate, magnesium palmitate, sodium zoomarate, ammonium zoomarate, magnesium zoomarate, sodium margarate, ammonium margarate, potassium margarate, sodium stearate, potassium stearate, ammonium stearate, magnesium stearate, calcium stearate, sodium crotonate, sodium petroselinate, magnesium petroselinate, lithium oleate, sodium oleate, potassium oleate, ammonium oleate, magnesium oleate, calcium oleate, barium oleate, sodium elaidate, potassium elaidate, ammonium elaidate, magnesium elaidate, calcium elaidate, sodium ricinolate, potassium ricinolate, magnesium ricinolate, sodium linolate, potassium eleosterate, sodium linolenate, potassium linolenate, sodium parinarate, potassium parinarate, sodium nonadecanoate, ammonium nonadecanoate, magnesium nonadecanoate, sodium arachate, ammonium arachate, magnesium arachate, sodium arachidonate, potassium arachidonate, sodium gadoleate, ammonium gadoleate, magnesium gadoleate, sodium heneicosanoate, sodium behenate, potassium behenate, ammonium behenate, calcium behenate, magnesium behenate, aluminum behenate, lead behenate, sodium erucate, potassium erucate, magnesium eructe, calcium erucate, ammonium erucate, aluminum erucate, sodium brassidate, ammonium brassidate, magnesium brassidate, sodium lignocerate, potassium lignocerate, ammonium lignocerate, calcium lignocerate, magnesium lignocerate, sodium cerotate, potassium cerotate, ammonium cerotate, magnesium cerotate, sodium montanate, potassium montanate, ammonium montanate, magnesium montanate, calcium montanate, sodium melissate, potassium melissate, ammonium melissate and magnesium melissate; salts of alkylarylsulfonic acids such as sodium xylenesulfonate, sodium dodecylbenzenesulfonate, sodium laurylbenzenesulfonate, sodium toluenesulfonate, sodium isopropylnaphthalenesulfonate, sodium naphthalenetrisulfonate, sodium tetrahydronaphthalenesulfonate, ammonium polybutylnaphthalenesulfonate, potassium isopropylnaphthalenesulfonate and sodium nonylbenzenesulfonate; salts of a sulfonic-acid of an alkylsuccinimide such as dioctylsulfosuccinate, sodium dioctylsulfosuccinate, sodium N-octadecylsulfosuccinate, tetrasodium N-(1,2-dicarboxyethyl)-N-octadecylsulfosuccinate, di-(2-ethylhexyl) sodium sulfosuccinate, diamyl sodium sulfosuccinate, dihexyl potassium sulfosuccinate and dioctyl sodium sulfosuccinate; salts of amido-bonded sulfonic acids such as sodium N-cyclohexyl-N-palmitoyltaurate, sodium oleylmethyltaurate and sodium N-methyl-N-oleyltaurate; salts of a higher alcohol sulfonate having 6 to 18 carbon atoms such as sodium cetyl alcohol-sulfonate, sodium oleyl alcohol-sulfonate, potassium oleyl cetyl alcohol-sulfonate and sodium lauryl alcohol-sulfonate; salts of a higher alcohol sulfonate such as oleyl cetyl ammonium sulfate and octadecyl alcohol sodium sulfate; salts of a sulfuric ester of a fat, oil or wax such as sulfonated castor oil, sulfonated coconut oil monoglyceride, sulfonated glycerol monoricinate, sulfonated pine oil and sulfonated cotton seed oil; salts of butyl ricinoleate sulfonates containing an esterbond; salts of sulfates containing an olefin bond, sulfuric esters such as an ammonium salt of alkylphenoxypolyethyleneethanol sulfate; salts of phosphoric esters such as sodium monoleyl phosphate, sodium dodecyl phosphate, dibutyl naphthalenephosphate, sodium 2-ethylhexyl tripolyphosphate and sodium capryl tripolyphosphate, higher aliphatic acid esters of alcoholamines such as triethanolamine oleate, isopropanolamine oleate, triethanolamine laurate, triethanolamine myristate and triethanolamine stearate; higher aliphatic acid esters of alcohol amides such as monoisopropanolamide laurate, monoisopropanaolamide myristate and diethanolamide stearate; sulfates of higher aliphatic acid ethers such as lauryl ether sulfate, oleyl ether sulfate and stearyl ether sulfate; sulfonates of higher aliphatic acid amides such as laurylamide sulfonate, oleylamide sulfonate and stearylamide sulfonate; salts of carboxyalkylamides such as sodium carboxymethylamide and sodium carboxyethylamide; sulfates of glycolethers such as tridecylglycolether sodium sulfate, polyglycolether nonylphenol sulfate, nonylphenolpolyglycolether sodium sulfate and polyglycolether tridecanol sulfate; others such as pentasodium diethylenetriamine pentaacetate and sodium oleylstearyl isothiocyanate.

Many commercially available detergents contain as a main component an anionic surface active agent, e.g., one or more anionic surface active agents are present, and further, a builder is incorporated therein. In this invention, those detergents containing additives such as a builder can be used so long as at least one anionic surface active agent is present.

Of these anionic surface active agents, salts of aliphatic acids having 11 to 18 carbon atoms are preferably used in this invention. In particular, salts of unsaturated aliphatic acids (e.g., oleate) are more preferred than salts of saturated aliphatic acids (e.g., stearate) because the former are more effective. It has also been found that of these salts of aliphatic acids, alkali metal salts, particularly sodium salts and potassium salts, are more preferred.

At least one of the above anionic surface active agents is contacted with the ferromagnetic particles in the form of an aqueous solution.

The term "aqueous solution" used in this specification means solutions comprising water or a mixture of water and a polar organic solvent which is completely or partially miscible with water (provided that 50 wt. % or more of the solution is water). The polar organic solvents include alcohols such as methyl alcohol, ethyl alcohol, propyl alcohol, isopropyl alcohol, butyl alcohol, etc.; ketones such as acetone methyl ethyl ketone, methyl isobutyl ketone, etc.; amines such as methyl amine, ethyl amine, isopropyl amine, n-propyl amine, etc.; dimethyl sulfoxide, dimethylformamide, tetrahydrofuran, dioxane, and the like. While the term "aqueous solution" is generally used in the following discussion to refer to an aqueous solution of the anionic surface active agent, needless to say if the volatile corrosion inhibitor is also present, then the aqueous solution will contain both components.

In treating the ferromagnetic metal powder with the anionic surface active agent-containing aqueous solution, if the conductivity of the water containing the ferromagnetic metal powder is about 50 m $v$/cm or less when the ferromagnetic metal powder is removed, the ferromagnetic metal powder is preferably washed. Particularly preferably the ferromagnetic metal powder is washed when the conductivity is 20 m $v$/cm or less. This is so because if the conductivity is not less than 50 m $v$/cm, the anionic surface active agent and dissolved ions tend to interact, forming insoluble salts, whereby it is difficult to separate the insoluble salts from the ferromagnetic metal powder.

The pH of the anionic surface active agent-containing aqueous solution preferably ranges from about 3 to 9. Where the pH is less than about 3, a dissolution of the ferromagnetic metal powder tends to take place. On the other hand, where the pH is above about 9, precipitation of hydroxides and the like tends to occur, and in order to remove the precipitate so produced, complex salts and the like must be formed, whereby the composition of the solution is complicated.

The treatment conditions for the ferromagnetic powder with the above anionic surface active agent-containing aqueous solution are: time from about 30 seconds to about 50 hours, preferably from 2 minutes to 2 hours; temperature from about 10° to about 80° C., preferably from 16° to 30° C. The treatment time includes the time of mixing and dispersing the ferromagnetic powder and anionic surface active agent in an aqueous solution and includes the case of storage for two days under the same conditions after mixing and dispersing. While the above treating can be carried out at wide range of temperatures, e.g., low to high, it is most preferably carried out at room temperature.

On a commercial scale, the concentration of the anionic surface active agent in the aqueous solution is preferably 50 ppm or more. If the concentration is lower than the above value, the effect of rendering the ferromagnetic metal powders non-oxidizable is not readily obtained. The weight ratio of the amount of anionic surface active agent (which is denoted by A) to the amount of the ferromagnetic metal powder (which is denoted by P), that is, A/P, is preferably within 0.0001 to 0.20. It is considered that a satisfactory effect is obtained when the anionic surface active agent is adsorbed on the surface of the ferromagnetic metal particles to form a one or two molecule deep layer.

As described hereinbefore, the ferromagnetic metal powders used in this invention can be prepared through a wet reduction reaction, e.g., subjecting a salt or salts of a ferromagnetic metal or metals in solution to reduction using a reducing agent.

In this invention, the ferromagnetic metal powders obtained by the above methods, for example, ferromagnetic metal powders obtained through an oxidation-reduction reaction in aqueous solution using sodium borohydride as the reducing agent, are separated from the reaction solution. If the electric conductivity of the reaction solution is less than 20 m $v$/cm, the ferromagnetic metal powders are directly forwarded to a subsequent treatment. However, when the electric conductivity is more than 20 m $v$/cm, it is preferred to wash the ferromagnetic metal powders with water to reduce the electric conductivity to less than 20 m $v$/cm.

The separated ferromagnetic metal powders are then treated with a volatile corrosion inhibitor to adsorb the inhibitor onto the surface of the powders and then dried in nitrogen or inert gas, such as He, Ne, Ar, Kr, Xe, etc., preferred inert gases being He, Ne, Ar., or in air.

The pressure, temperature and time of drying can vary considerably, but generally a pressure of from about 5 mm Hg to about 5 atm, preferably, 10 mm Hg to 1.5 atm, a temperature of from about 20° to about 300° C., preferably 60° to 200° C., and the time of from about 30 minutes to about 10 days, preferably one hour to 24 hours, is utilized.

Moreover, in treating with the volatile corrosion inhibitor as described above, an anionic surface active agent such as sodium oleate may be adsorbed on the surface of the ferromagnetic metal powders by washing the powders with an aqueous solution containing the anionic surface active agent. in this washing, it is important to uniformly mix and disperse the particles of the ferromagnetic metal powder.

The ferromagnetic metal powders thus treated are dried as such in nitrogen or inert gas, or in air, as earlier described. Alternatively, they are immersed in an organic solvent as later described as a coating solvent. In general, they are mixed and dispersed in a binder, which is coated on a support, dried and then used as a magnetic recording medium in the form of tape, disc, sheet, card and the like.

A more preferred embodiment is to add the afore-said non-magnetic element or organic compound as described in Japanese Patent Publication Nos. 20,116/68, 14,934/70, 41,719/72 (U.S. Pat. No. 3,607,218) and 7,820/72, Japanese Patent Laid-Open Application Nos. 42,253/72, 44,194/72, 79,754/73 and 82,396/73, etc., to a salt of a ferromagnetic metal, subject the same to reduction to obtain ferromagnetic powders having excellent oxidation resistance, and then treat the powders with a solvent containing an anionic surface active agent as described. It is to be noted that this treatment with an anionic surface active agent can follow the treatment with a volatile corrosion inhibitor or the treatment with a volatile corrosion inhibitor can follow treatment with an anionic surface active agent or, in fact, treatment with a mixture of a volatile corrosion inhibitor plus an anionic surface active agent can follow treatment with a volatile corrosion inhibitor, if desired.

The ferromagnetic metal powders obtained by this invention have a particle size of 50 to 1000 Å (minor axis) and can have a spherical to needle-like shape (including a chain shape formed by several to several tens of spherical particles, e.g., 2 to 20).

It is effective to enhance the effects of this invention to heat the ferromagnetic powders obtained by any of the above methods in a non-oxidizing atmosphere or heat them in the presence of a minor amount of $H_2O$ or $O_2$. For example, such a modification is described in Japanese Patent Publication Nos. 3,862/70, 26,555/63, 9,869/70 and 16,052/72. This invention can be combined with such modification, if desired.

A ferromagnetic metal powder of this invention obtained in the above manner is also dispersed in a binder, which is coated using an organic solvent on a base (support) and dried to form a magnetic layer for use as a magnetic recording medium.

The methods of preparing magnetic coating composition used in this invention are described in detail, e.g., in Japanese Patent Publication Nos. 186/68, 28,043/72, 28,045/72, 28,046/72, 28,048/72 and 31,445/72. The magnetic coating composition described in the above specifications contain as main components a ferromagnetic powder, a binder and a solvent for coating, and, optionally, contains additives such as a dispersing agent, a lubricant, an abrasive and an antistatic agent.

Hitherto known thermoplastic resins, thermosetting resins, or mixtures thereof, can be used as binders for the ferromagnetic metal powder of the present invention.

Suitable thermoplastic resins are those resins which have a softening point of about 150° C. or less, an average molecular weight of about 10,000 to 200,000, and a degree of polymerization on the order of about 200 to 2,000, e.g., a vinyl chloride-vinyl acetate copolymer, a vinyl chloridevinylidene chloride copolymer, a vinyl chloride-acrylonitrile copolymer, an acrylate-acrylonitrile copolymer, an acrylatevinylidene chloride copolymer, an acrylate-styrene copolymer, a methacrylate-acrylonitrile copolymer, a methacrylatevinylidene chloride copolymer, a methacrylate-styrene copolymer, a urethane elastomer, a polyvinyl fluoride, a vinylidene chloride-acrylonitrile copolymer, a butadiene-acrylonitrile copolymer, a polyamide resin, polyvinyl butyral, cellulose derivatives such as cellulose acetate butyrate, cellulose diacetate, cellulose triacetate, cellulose propionate, cellulose nitrate, and the like, a styrene-butadiene copolymer, a polyester resin, a chlorovinyl ether-acrylate copolymer, an amino resin, various synthetic rubber based thermoplastic resins such as neoprene rubber, isoprene rubber, styrenebutadiene rubber, etc., and mixtures thereof.

Suitable examples of these resins which can be used as described in Japanese Patent Publication Nos. 6877/1962, 12528/1964, 19282/1964, 5349/1965, 20907/1965, 9463/1966, 14059/1966, 16985/1966, 6428/1967, 11621/1967, 4623/1968, 15206/1968, 2889/1969, 17947/1969, 18232/1969, 14020/1970, 14500/1970, 18573/1972, 22063/1972, 22064/1972, 22068/1972, 22069/1972, 22070/1972, 27886/1973, U.S. Pat. Nos. 3,144,352, 2,419,420, 3,499,789, 3,713,887, etc.

Suitable thermosetting resins have a molecular weight of about 200,000 or less as a coating solution, and when heated after coating and drying, the molecular weight becomes infinite due to reactions such as condensation, addition, and the like. Of these resins, preferred resins are those resins which do not soften or melt before the resin thermally decomposes. Representative examples of these resins are a phenol resin, an epoxy resin, a polyurethane hardening type resin, a urea resin, a melamine resin, an alkyd resin, a silicone resin, an acryl based reactive resin, an epoxypolyamide resin, a mixture of a high molecular weight polyester resin and an isocyanate prepolymer, a mixture of a methacrylic acid salt copolymer and a diisocyanate prepolymer, a mixture of a polyesterpolyol and a polyisocyanate, a urea-formaldehyde resin, a mixture of a low molecular weight glycol, a high molecular weight diol and triphenylmethane triisocyanate, a polyamine resin, and mixtures thereof, etc.

Suitable examples of these resins which can be used are described in Japanese Patent Publication Nos.

8103/1964, 9779/1965, 7192/1966, 8016/1966, 14275/1966, 18179/1967, 12081/1968, 28023/1969, 14501/1970, 24902/1970, 13103/1971, 22065/1972, 22066/1972, 22067/1972, 22072/1972, 22073/1972, 28045/1972, 28048/1972, 28922/1972, U.S. Pat. Nos. 3,144,353, 3,320,090, 2,437,510, 3,597,273, 3,781,210, 3,781,211, etc.

These binders can be used individually or in combination with each other, and other additives can be added to the binders. The weight ratio of the ferromagnetic powder to the binder is generally about 100:10 to 100:200. When the proportion of the binder is less than about 10 parts by weight, the ability of the binder to bind the fine ferromagnetic powder becomes weak, and the ferromagnetic powder tends to come off from the magnetic layer. This leads to the disadvantage that the fine ferromagnetic powder that has come off adheres to the magnetic head, or damages the surface of the magnetic layer. On the other hand, when the proportion of the binder is above about 200 parts by weight, the magnetic flux density of the magnetic layer is reduced because the non-magnetic property of the binder dominates the layer characteristics.

The magnetic recording layer may contain, in addition to the afore-said binder and the ferromagnetic powders, additives such as a dispersing agent, a lubricant, an abrasive and an antistatic agent.

The dispersing agents used include aliphatic acids having 12 to 18 carbon atoms ($R_1COOH$ wherein $R_1$ is an alkyl group having 11 to 17 carbon atoms) such as caprylic acid, capric acid, lauric acid, myristic acid, palmitic acid, stearic acid, oleic acid, elaidic acid, linolic acid, linolenic acid and stearolic acid; metal soaps comprising an alkali metal (such as Li, Na and K) or an alkaline earth metal (such as Mg, Ca and Ba) salt of the above aliphatic acid; lecithin, etc. In addition, higher alcohols having 12 or more carbon atoms and sulfuric esters can be used. These dispersing agents are added in an amount of 1 to 20 parts by weight per 100 parts by weight of the binder.

The lubricants used include silicone oil, carbon black, graphite, a carbon black-grafted polymer, molybdenum disulfide, tungusten disulfide, aliphatic esters obtained from monobasic aliphatic acids having 12 to 16 carbon atoms and monohydric alcohols having 3 to 12 carbon atoms, aliphatic esters obtained from monobasic aliphatic acids having 17 or more carbon atoms and monohydric alcohols (the carbon atoms of the monobasic aliphatic acid and the carbon atoms of the monohydric alcohol total 21 to 23), etc. These lubricants are added in an amount of 0.2 to 20 parts by weight per 100 parts by weight of the binder. These lubricants are described, e.g., in Japanese Patent Publication No. 23,889/68, Japanese Patent Application Nos. 28,647/67 and 81,543/68, U.S. Pat. Nos. 3,470,021, 3,492,235, 3,497,411, 3,523,086, 3,625,760, 3,630,772, 3,634,253, 3,642,539 and 3,687,725, "IBM Technical Disclosure Bulletin", vol. 9, No. 7 page 779 (December 1966), "ELEKTRONIK" No 12, page 380 (1961), etc.

The abrasives used include those which are generally used, such as fused alumina, silicon carbide, chromium oxide, corundum, artificial corundum, diamond, artificial diamond, garnet and emery (main components: corundum and magnetite). The average particle diameter of these abrasives is 0.05 to 5µ, preferably 0.1 to 2µ. These abrasives are added in an amount of 7 to 20 parts by weight per 100 parts by weight of the binder. These abrasives are described in Japanese Patent Application No. 26,749/73, U.S. Pat. Nos. 3,007,807, 3,041,196, 3,293,066, 3,630,910 and 3,687,725, British Pat. No. 1,145,349, and West German Pat. No. 853,211.

Magnetic recording layers are formed by dissolving the above components in an organic solvent to make a coating composition and then coating the same on a support.

The thickness of the support used is conventional and is about 5 to 50 µm, preferably about 10 to 40 µm. The materials used for the support include polyesters such as polyethylene terephthalate and polyethylene-2,6-naphthalate, polyolefins such as polypropylene, cellulose derivatives such as cellulose triacetate and cellulose diacetate, polycarbonate, and the like.

For preventing static discharge or preventing transfer printing, the above supports may have a back coat on the surface opposite the surface provided with the magnetic layer. Descriptions of back coats are found, e.g., in U.S. Pat. Nos. 2,804,401, 3,293,066, 3,617,378, 3,062,676, 3,734,772, 3,476,596, 2,643,048, 2,803,556, 2,887,462, 2,923,642, 2,997,451, 3,007,892, 3,041,196, 3,115,420 and 3,166,688, etc.

The supports may be in any shape such as a tape, sheet, card, disc or drum, and various materials can be used depending upon the shape desired and end use contemplated.

The afore-said magnetic recording layer can be coated on the support by various conventional methods including air doctor coating, blade coating, air knife coating, squeeze coating, impregnation coating, reverse roll coating, transfer roll coating, gravure coating, kiss coating, cast coating and spray coating. Other coating methods can also be used. The details of these methods are described in "Coating Engineering" pp. 253 to 277, Asakura Publisher (Mar. 20, 1971).

The organic solvents which can be used for coating include ketones such as acetone, methyl ethyl ketone, methyl isobutyl ketone and cyclohexanone; alcohols such as methanol, ethanol, propanol and butanol; esters such as methyl acetate, ethyl acetate, butyl acetate, ethyl lactate and glycol monoethyl ether acetate; glycol ethers such as ether, glycol dimethyl ether, glycol monoethyl ether and dioxane; aromatic hydrocarbons such as benzene, toluene and xylene; chlorinated hydrocarbons such as methylene chloride, ethylene chloride, carbon tetrachloride, chloroform, ethylene chlorohydrin and dichlorobenzene; and the like.

The magnetic layer coated on the support by the above method is dried after, if desired, the coating has been subjected to a treatment for orienting the magnetic powder in the layer. Suitable treatments for orienting the magnetic powder in the layer are disclosed in U.S. Pat. Nos. 1,949,840, 2,796,359, 3,001,891, 3,172,776, 3,416,949, 3,473,960 and 3,681,138; Japanese Patent Publication Nos. 3427/1957, 28368/1964, 23624/1965, 23625/1965, 13181/1966, 13043/1973 and 39722/1973. If required, the magnetic layer can be subjected to a surface-smoothening treatment, or cut to the desired shape, to thereby form the magnetic recording material of this invention. Suitable surface-smoothening techniques are disclosed in U.S. Pat. Nos. 2,688,567, 2,998,325 and 3,783,023, and German Patent Application (OPI) No. 2,405,222.

In the above orienting treatment for the magnetic layer, the orienting magnetic field can be either an AC or DC magnetic field with a field strength of about 500 to 2,000 gauss. The drying temperature can range from about 50° to about 100° C., and the drying time is about 3 to 10 minutes.

In the surface-smoothening treatment of the magnetic layer, preferably a calendering method is used in which the magnetic layer is passed between a metal roll and a non-metallic roll while the layer is heated under pressure. A combination of a metal roll and a roll made of cotton and a combination of a metal roll and a roll made of a synthetic resin are especially preferred. The pressure used in this treatment is about 25 to 500 Kg/cm, and the surface temperature of the metal roll is kept at about 35° to 150° C. The rate of the treatment is about 5 to 120 meters/min. When the pressure and temperature are below the lower limits of the above-specified ranges, the effect of the surface-smoothening treatment is difficult to achieve. Pressures and temperatures higher than the upper limits of the above specified ranges are not preferred because the support of the magnetic recording material is deformed. When the treating rate is less than about 5 meters/min. the operating efficiency is low, and if the rate is above 120 meters/min., operation is difficult.

The most preferred process for the production of a magnetic recording medium disclosed above is the process disclosed in Japanese Patent Application (OPI) No. 41506/1975 (corresponding to U.S. patent application Ser. No. 498,337, filed on Aug. 19, 1974).

The effects and advantages of this invention are set forth below.

(i) The oxidation of ferromagnetic metal powders in after-treatments (after their production) can be prevented, and powders having a high $\sigma s$ can be obtained.

(ii) The ferromagnetic powders obtained have good resistance to high temperature and high humidity.

(iii) The ferromagnetic powders obtained have good magnetic stability.

(iv) The ferromagnetic metal powders obtained are excellent in dispersibility with a binder and suitable for use in a magnetic recording medium.

(v) In particular, particles of about 100 Å are suitable for use in a magnetic fluid.

(vi) Lowering of the $\sigma s$ during storage can be prevented.

(vii) Synergistic effects can be obtained by treating with a volatile corrosion inhibitor in combination with an anionic surface active agent.

This invention is explained in greater detail by reference to the following examples and comparative examples. It will be easily understood to those skilled in the art that components, amounts, order of operation and the like can be changed without departing from the spirit and scope of this invention. Therefore, this invention should not be limited to the following examples.

Unless otherwise indicated, in the following examples all parts and percentages were by weight, and all processings were at atmospheric pressure and at room temperature, unless otherwise indicated.

| | | |
|---|---|---|
| $M_1$ solution | ferrous chloride | 0.36 M/l |
| | cobalt chloride | 0.04 M/l |
| $R_1$ solution | NaBH$_4$ (0.01 N NaOH solution) | 1.6 M/l |

80 parts of the above $M_1$ solution was placed in a non-magnetic container. A DC magnetic field (max. 1,000 Oe) was applied to the container, and 20 parts of the above $R_1$ solution was added to the $M_1$ solution over a 10 second period while slowly stirring to effect oxidation-reduction. The temperature of the solution was 20° C. at the beginning of the reaction, but due to the exothermic reaction, it tended to rise.

By cooling externally, the peak temperature was controlled at 35° C. The reaction rapidly occurred with the generation of H$_2$ gas and was stopped after 2 minutes. There were obtained black ferromagnetic powders. The powders were separated from the reaction mother liquid, added to 100 parts of distilled water containing 0.01% dicyclohexylamine nitrite per 1 part of the powder and dispersed therein for 1 minute by applying ultrasonic waves of 29 KHz and 150 W. The supernatant liquid was then removed, and the residue was washed three times with 50 parts of distilled water containing 0.01% dicyclohexylamine nitrite (24° C.; 30 mins. per wash). Thereafter, the residue was washed with 50 parts of acetone three times to remove water and then dried using a hot-air dryer at 40° C. to obtain ferromagnetic powders (referred to as Sample P-1). The reaction yield was 60%. The ferromagnetic powders obtained were ferromagnetic Fe-Co-B alloy powders having an average particle size of 300 Å in a needle-like shape in which the spherical particles formed a chain. The powders were added to a small amount of water. When metaphenylenediamine reagent was added thereto, a yellow coloration resulted, which indicated the presence of nitrite ion. From the result of an analysis of the powder, it was found that it contained 2 wt. % B and 11 wt. % of Co per 100 wt. % of Fe. 1200 parts of butyl acetate was added to 300 parts of the powder, and then stirring at a high shearing force was effected at ambient temperature for 2 hours. The following composition was then added thereto, and the resulting mixture ball milled for 10 hours. Then, 22 parts of a triisocyanate compound (trade name of Desmodur L-75 made by Bayer A. G.; a 75% by weight ethyl acetate solution of an adduct of 3 mols of toluene diisocyanate and 1 mol of trimethylolpropane; m.w., ca. 560) was added thereto, and the system dispersed with high shearing force for 1 hour to form a magnetic coating composition.

| | Parts |
|---|---|
| Polyester Polyurethane (molecular weight about 30,000; addition polymerization product of polyester and m-xylylenediisocyanate, the polyester being produced by the condnesation of ethylene glycol and adipic acid; Desmocoll 400, produced by Bayer AG) | 30 |
| Non-drying Oil-modified Alkyd Resin (reaction product of glycerin, terephthalic acid and a synthetic non-drying oil of an oil lengthof 30%; hydroxyl value of about 130; Burnock DE-180-70, produced by Japan Reichold Co., Ltd.) | 35 |
| Silicone oil (dimethylpolysiloxane) | 2 |

The coating composition was coated by doctoring on one side of a polyethylene terephthalate film (25 microns thick) so as to provide a film thickness of 5 microns (dry basis) while applying a 2,500 gauss D.C. magnetic field for 0.02 sec., and then dried while heating at 100° C. for 2 minutes with a 3 Kl/m$^2$ of air flow for 2 minutes. The broad magnetic web thus obtained was super-calendered at 60° C., 60 Kg/cm of pressure, and a 40 m/min. rate and slit in to a ½ inch width video tape. The tape obtained had excellent surface properties and was referred to as Sample T-1.

EXAMPLE 2

| | | |
|---|---|---|
| M₂ solution | ferrous chloride | 0.695 M/l |
| | cobalt chloride | 0.285 M/l |
| | chromium chloride (CrCl₃ . 6H₂O) | 0.02 M/l |
| R₂ solution | NaBH₄ (0.01 N NaOH solution) | 3.5 M/l |

The procedure of Example 1 was repeated using the above reaction solutions to obtain black ferromagnetic powders which were subjected to after-treatments in the same manner as in Example 1 to obtain powders and then a tape. The average particle diameter of these powders was 350 Å. The analysis of the powders showed 43 wt. % of Co and 6 wt. % of Cr per 100 wt. % of Fe. The powders obtained were referred to as Sample P-2, and the tape obtained referred to as Sample T-2.

EXAMPLE 3

Black ferromagnetic powders were prepared in the same manner as in Example 2. Then, the powders were separated from the reaction mother liquid and washed three times with 50 parts of distilled water per 1 part of the powders. Thereafter, 50 parts of ethyl alcohol containing 2% dicyclohexylamine nitrite was added to the powders, and they were mixed with stirring at a revolution speed of 1,500 r.p.m. for 5 minutes so to form a dispersion, thus adsorbing the dicyclohexylamine nitrite onto the surface of the powders.

The supernatant liquid was then decanted, and the residue washed with 50 parts of acetone three times, separated from the acetone and dried with hot air at 40° C. The particles obtained had an average particle diameter of 350 Å. The particles were referred to as Sample P-3. The powders were then made into a tape in the same manner as in Example 1, and the tape obtained was referred to as Sample T-3.

EXAMPLE 4

The procedure of Example 2 was repeated except for using the following volatile corrosion inhibitors in place of dicyclohexylamine nitrite.

(A) 5% aqueous solution of diisopropylamine nitrite
(B) 1% aqueous solution of cyclohexylammonium carbonate The powders obtained using (A) above were referred to as Sample P-4A and using (B) above as Sample P-4B, and the tape obtained using the Sample P-4A above referred to Sample T-4A and the tape obtained using Sample P-4B as Sample T-4B.

COMPARATIVE EXAMPLE 1

The procedure of Example 1 was repeated except for omitting dicyclohexylamine nitrite to prepared powders and then a tape. The powders obtained were referred to as Sample PC-1, and the tape obtained was referred to as Sample TC-1.

Powder Sample PC-1 was added to a small amount of water, metaphenylenediamine reagent added thereto, and the coloration observed. No nitrite ions were detected.

COMPARATIVE EXAMPLE 2

Reaction was effected in the same manner as in Example 2 except for adding (A) 0.001 M/l or (B) 0.01 M/l of dicyclohexylamine nitrite to the M₂ solution. The aftertreatment step was effected in the same manner as in Example 2 except for using distilled water free of dicyclohexylamine nitrite, thus preparing powders and then tapes. The powders obtained were referred to as Samples PC-2A and PC-2B, respectively. The tapes obtained were referred to as Samples TC-2A and TC-2B, respectively. Various characteristics of the Samples obtained in Examples 1 to 4 and Comparative Examples 1 and 2 were measured, and the results obtained shown in Tables 1 and 2.

TABLE 1

| Sample No. | Saturation Magnetization:σs (emu/g) | σs after standing at 60° C. and 90% RH for 7 days (emu/g) |
|---|---|---|
| (this invention) | | |
| P-1 | 105.0 | 90.3 |
| P-2 | 107.6 | 98.5 |
| P-3 | 102.1 | 92.8 |
| P-4A | 108.3 | 98.4 |
| P-4B | 106.0 | 95.2 |
| (comparison) | | |
| PC-1 | 90.4 | 46.5 |
| PC-2A | 88.7 | 75.8 |
| PC-2B | 79.9 | 69.6 |

(Values when magnetic field on measurement: Hm = 3,000 Oe)

TABLE 2

| Sample No. | Hc (Oe) | Br/Bm | After standing at 60° C. and 90% RH for 7 days Hc (Oe) | Percentage of decrease in Br (%) |
|---|---|---|---|---|
| (this invention) | | | | |
| T-1 | 1,100 | 0.84 | 1,120 | 10 |
| T-2 | 980 | 0.83 | — | — |
| T-3 | 980 | 0.82 | — | — |
| T-4A | 970 | 0.83 | — | — |
| T-4B | 980 | 0.82 | — | — |
| (comparison) | | | | |
| TC-1 | 1,100 | 0.81 | 1,180 | 34 |
| TC-2A | 870 | 0.80 | — | — |
| TC-2B | 630 | 0.76 | — | — |

(Values when magnetic field on measurement: Hm = 2,000 Oe)

As is apparent from the above results, the ferromagnetic powders can be improved in σs by treating them with a solution containing a volatile corrosion inhibitor according to this invention. Moreover, the lowering of the σs can be improved even when the powders are allowed to stand in an atmosphere of 60° C. and 90% RH.

Regarding the tapes, an improvement in the squareness ratio was observed in all cases. Furthermore, on comparing Example 1 with Comparative Example 1, the percentage of decrease in the Br and the increase in the Hc after standing at 60° C. and 90% RH were lower when the ferromagnetic metal powders of this invention were used: thus, a stable tape can be obtained using such powders.

The above results show that the ferromagnetic powders of this invention are stable when stored for a long period of time. The initial Br was 2,550 gauss and 2,150 gauss for T-1 and TC-1, respectively. It can be seen from Example 2 and Comparative Example 2 that it is ineffective to add a volatile corrosion inhibitor to the reaction bath and then form ferromagnetic powders therein.

EXAMPLE 5

Black ferromagnetic metal powders were prepared in the same manner as in Example 1. Then, the powders were separated from the reaction mother liquor and added to 100 parts of distilled water containing 0.01% dicyclohexylamine nitrite per 1 part of the powders, whereafter stirring with a high shearing force was effected for 5 minutes. Thereafter, the supernatant liquid was decanted, and the residual powders added to 100 parts of distilled water containing 0.1% of sodium oleate, whereafter the system was stirred at a revolution rate of 1500 r.p.m. for 5 minutes. The supernatant liquid was then decanted, and the residue washed with 50 parts of acetone three times to remove water and then dried for 20 hours using a hot air at 40° C. As a result, the powders obtained showed a $\sigma s$ of 109 emu/g, and, after standing at 60° C. and 90% RH for 7 days, a $\sigma s$ of 98 emu/g. The powders were made into a tape in the same manner as in Example 1. The tape showed an Hc of 980 Oe, a Br/Bm of 0.86 and a Br/Hc of 2.8. After standing in an atmosphere of 60° C. and 90% RH for 7 days, the Hc slightly increased to 1000 Oe, but no substantial change was observed in the surface of the tape.

COMPARATIVE EXAMPLE 3

Ferromagnetic metal powders were prepared in the same manner as in Comparative Example 1. Then, the powders were made into a tape in the same manner as in Example 1, in which 0.01 part of powders of dicyclohexylamine nitrite was added with the binder per 1 part of the ferromagnetic metal powders and then they were kneaded. The tape obtained had the following characteristics: an Hc of 1,100 Oe, a Br/Bm of 0.82 and a Br of 2,200 gauss. After standing in an atmosphere of 60° C. and 90% RH for 7 days, the tape showed an Hc of 1,140 Oe, a Br/Bm of 0.83, a Br of 1,930 gauss and a percentage of decrease in the Br of 12.3%. On comparing Comparative Example 3 with Example 1 and Comparative Example 1, the tape obtained by adding the volatile corrosion inhibitor together with the binder on kneading showed a lower initial Br as compared with the tape obtained by previously treating the magnetic powders with the volatile corrosion inhibitor, but showed a slightly higher percentage of the decrease in Br, which percentage was, however, remarkably improved as compared with Comparative Example 1. In addition, the increase in the Hc was about 3.6%. The percentage of the decrease in the Br and the increase in the Hc of a tape can be improved by the method of kneading a volatile corrosion inhibitor together with a binder on forming the tape as in this Comparative Example. However, this invention provides a tape having further improved characteristics as compared with that obtained by such a method.

While the invention has been described in detail and with reference to specific embodiments thereof, it will be apparent to one skilled in the art that various changes and modifications can be made therein without departing from the spirit and scope thereof.

What is claimed is:

1. A method of preparing a corrosion-resistant ferromagnetic metal powder after forming said ferromagnetic metal powder comprising washing the formed ferromagnetic metal powder with a solution containing
   (a) at least one volatile corrosion inhibitor, said volatile corrosion inhibitor being an organic amine, amide or imide, or an organic or inorganic salt thereof, containing 1 to 4 nitrogen atoms and 1 to 12 carbon atoms and having a molecular weight of 50 to 200 and a vapor pressure of about $0.1 \times 10^{-5}$ to $1 \times 10^2$ mmHg at a temperature of 15° to 25° C.;
   (b) (1) water, (2) an organic solvent miscible with water, or (3) a mixture of water and at least one organic solvent miscible with water; and
   (c) an anionic surface active agent selected from the group consisting of a carboxylic acid or salt thereof, a salt of a sulfuric acid ester, a salt of a phosphoric acid ester, a salt of a dithiophosphoric acid ester and a salt of a sulfonic acid.

2. A method of preparing a corrosion resistant ferromagnetic metal powder after forming said ferromagnetic metal powder comprising washing the formed ferromagnetic metal powder with a solution containing
   (a) at least one volatile corrosion inhibitor, said volatile corrosion inhibitor being an organic amine, amide or imide, or an organic or inorganic salt thereof, containing 1 to 4 nitrogen atoms and 1 to 12 carbon atoms and having a molecular weight of 50 to 200 and a vapor pressure of about $0.1 \times 10^{-5}$ to $1 \times 10^2$ mmHg at a temperature of 15° to 25° C.; and
   (b) (1) water, (2) an organic solvent miscible with water, or (3) a mixture of water and at least one organic solvent miscible with water;
   and additionally contacting said ferromagnetic metal powder thereafter with an aqueous solution containing an anionic surface active agent selected from the group consisting of a carboxylic acid or salt thereof, a salt of a sulfuric acid ester, a salt of a phosphoric acid ester, a salt of a dithiophosphoric acid ester and a salt of a sulfonic acid.

3. A method of preparing a corrosion resistant ferromagnetic metal powder after forming said ferromagnetic metal powder comprising drying the formed ferromagnetic metal powder in an atmosphere containing at least one volatile corrosion inhibitor, said volatile corrosion inhibitor being an organic amine, amide or imide, or an organic or inorganic salt thereof, containing 1 to 4 nitrogen atoms and 1 to 12 carbon atoms and having a molecular weight of 50 to 200 and a vapor pressure of about $0.1 \times 10^{-5}$ to $1 \times 10^2$ mmHg at a temperature of 15° to 25° C.; and additionally contacting said ferromagnetic metal powder with an aqueous solution containing an anionic surface active agent selected from the group consisting of a carboxylic acid or salt thereof, a salt of a sulfuric acid ester, a salt of a phosphoric acid ester, a salt of a dithiophosphoric acid ester and a salt of a sulfonic acid.

4. The method of preparing a corrosion-resistant ferromagnetic metal powder as claimed in claim 1, in which the ferromagnetic metal powder has an average particle size of 50 to 1000 Å, wherein each particle comprises at least about 75% by weight of a metal, and the metal contains at least one of Fe, Fe-Co, Fe-Ni, Co-Ni or Fe-Co-Ni as a main component.

5. The method of preparing a corrosion-resistant ferromagnetic metal powder as claimed in claim 2, in which the ferromagnetic metal powder has an average particle size of 50 to 1000 Å, wherein each particle comprises at least about 75% by weight of a metal, and the metal contains at least one of Fe, Fe-Co, Fe-Ni, Co-Ni or Fe-Co-Ni as a main component.

6. The method of preparing a corrosion-resistant ferromagnetic metal powder as claimed in claim 3, in which the ferromagnetic metal powder has an average particle size of 50 to 1000 Å, wherein each particle comprises at least about 75% by weight of a metal, and the metal contains at least one of Fe, Fe-Co, Fe-Ni, Co-Ni or Fe-Co-Ni as a main component.

7. The method of preparing a corrosion resistant ferromagnetic metal powder as claimed in claim 1, in which the volatile corrosion inhibitor is a nitrite of an organic amine.

8. The method of preparing a corrosion resistant ferromagnetic metal powder as claimed in claim 2, in which the volatile corrosion inhibitor is a nitrite of an organic amine.

9. The method of preparing a corrosion resistant ferromagnetic metal powder as claimed in claim 3, in which the volatile corrosion inhibitor is a nitrite of an organic amine.

10. The method of preparing a corrosion-resistant ferromagnetic metal powder as claimed in claim 7, in which the nitrite of an organic amine is dicyclohexylamine nitrite or diisopropylamine nitrite.

11. The method of preparing a corrosion-resistant ferromagnetic metal powder as claimed in claim 8, in which the nitrite of an organic amine is dicyclohexylamine nitrite or diisopropylamine nitrite.

12. The method of preparing a corrosion-resistant ferromagnetic metal powder as claimed in claim 9, in which the nitrite of an organic amine is dicyclohexylamine nitrite or diisopropylamine nitrite.

13. The method of preparing a corrosion-resistant ferromagnetic metal powder as claimed in claim 1, in which the anionic surface active agent is an alkali metal salt of an aliphatic acid.

14. The method of preparing a corrosion-resistant ferromagnetic metal powder as claimed in claim 2, in which the anionic surface active agent is an alkali metal salt of an aliphatic acid.

15. The method of preparing a corrosion-resistant ferromagnetic metal powder as claimed in claim 3, in which the anionic surface active agent is an alkali metal salt of an aliphatic acid.

16. The method of preparing a corrosion-resistant ferromagnetic metal powder as claimed in claim 1, wherein said ferromagnetic metal powder is the product of an oxidation-reduction reaction in an aqueous solution.

17. The method of preparing a corrosion-resistant ferromagnetic metal powder as claimed in claim 2, wherein said ferromagnetic metal powder is the product of an oxidation-reduction reaction in an aqueous solution.

18. The method of preparing a corrosion-resistant ferromagnetic metal powder as claimed in claim 3, wherein said ferromagnetic metal powder is the product of an oxidation-reduction reaction in an aqueous solution.

19. The method of preparing a corrosion-resistant ferromagnetic metal powder as claimed in claim 1, wherein the concentration of the volatile corrosion inhibitor in said solution is 0.005% by weight or more based on the total solution weight.

20. The method of preparing a corrosion-resistant ferromagnetic metal powder as claimed in claim 2, wherein the concentration of the volatile corrosion inhibitor in said solution is 0.005% by weight or more based on the total solution weight.

21. The method of preparing a corrosion-resistant ferromagnetic metal powder as claimed in claim 19, wherein the concentration of the volatile corrosion inhibitor is 0.01 to 20% by weight.

22. The method of preparing a corrosion-resistant ferromagnetic metal powder as claimed in claim 20, wherein the concentration of the volatile corrosion inhibitor is 0.01 to 20% by weight.

23. The method of preparing a corrosion-resistant ferromagnetic metal powder as claimed in claim 1, wherein the ferromagnetic metal powder is washed with water containing said volatile corrosion inhibitor and the pH of the solution is about 5 to about 9.

24. The method of preparing a corrosion-resistant ferromagnetic metal powder as claimed in claim 2, wherein the ferromagnetic metal powder is washed with water containing said volatile corrosion inhibitor and the pH of the solution is about 5 to about 9.

25. The method of preparing a corrosion-resistant ferromagnetic metal powder as claimed in claim 1, wherein the temperature employed during the washing is 120° C. or less.

26. The method of preparing a corrosion-resistant ferromagnetic metal powder as claimed in claim 2, wherein the temperature employed during the washing is 120° C. or less.

27. The method of preparing a corrosion-resistant ferromagnetic metal powder as claimed in claim 3, wherein the temperature employed during the drying is 120° C. or less.

28. The method of preparing a corrosion-resistant ferromagnetic metal powder as claimed in claim 3, wherein the ferromagnetic metal powder is dried in an atmosphere containing said volatile corrosion inhibitor and the pressure is from about 0.5 to 5 atmospheres.

29. The method of preparing a corrosion-resistant ferromagnetic metal powder as claimed in claim 3, wherein the ferromagnetic metal powder is dried in an atmosphere containing said volatile corrosion inhibitor and said volatile corrosion inhibitor is present in an amount of from about 10 g/m$^3$ to about 2 Kg/m$^3$ of the treating atmosphere.

30. The method of preparing a corrosion-resistant feromagnetic metal powder as claimed in claim 1, wherein the ferromagnetic metal powder is washed and the pressure is 0.5 to 5 atmospheres.

31. The method of preparing a corrosion-resistant ferromagnetic metal powder as claimed in claim 2, wherein the ferromagnetic metal powder is washed and the pressure is 0.5 to 5 atmospheres.

32. The method of preparing a corrosion-resistant ferromagnetic metal powder as claimed in claim 1, wherein the contact time with said ferromagnetic metal powder is at least 1 minute.

33. The method of preparing a corrosion-resistant ferromagnetic metal powder as claimed in claim 2, wherein the contact time with said ferromagnetic metal powder is at least 1 minute.

34. The method of preparing a corrosion-resistant ferromagnetic metal powder as claimed in claim 3, wherein the contact time with said ferromagnetic metal powder is at least 1 minute.

35. The method of preparing a corrosion-resistant ferromagnetic metal powder as claimed in claim 1, wherein said volatile corrosion inhibitor has a high vapor pressure of $1 \times 10^{-2}$ to $1 \times 10^2$ mmHg at 20° C. and is used in combination with a volatile corrosion inhibitor having a lower vapor pressure of $0.1 \times 10^{-5}$ to less than $1 \times 10^{-2}$ mmHg at 20° C.

36. The method of preparing a corrosion-resistant ferromagnetic metal powder as claimed in claim 2, wherein said volatile corrosion inhibitor has a high vapor pressure of $1 \times 10^{-2}$ to $1 \times 10^2$ mmHg at 20° C. and is used in combination with a volatile corrosion inhibitor having a lower vapor pressure of $0.1 \times 10^{-5}$ to less than $1 \times 10^{-2}$ mmHg at 20° C.

37. The method of preparing a corrosion-resistant ferromagnetic metal powder as claimed in claim 3, wherein said volatile corrosion inhibitor has a high vapor pressure of $1 \times 10^{-2}$ to $1 \times 10^2$ mmHg at 20° C. and is used in combination with a volatile corrosion inhibitor having a lower vapor pressure of $0.1 \times 10^{-5}$ to less than $1 \times 10^{-2}$ mmHg at 20° C.

38. The method of preparing a corrosion-resistant ferromagnetic metal powder as claimed in claim 35, wherein the high vapor pressure volatile corrosion inhibitor is cyclohexylammonium carbonate, diisopropylamine nitrate, or guanidine carbonate and the low vapor pressure volatile corrosion inhibitor is dicyclohexylamine nitrite, dicyclohexylamine chromate or hexamethylenetetraamine.

39. The method of preparing a corrosion-resistant ferromagnetic metal powder as claimed in claim 36, wherein the high vapor pressure volatile corrosion inhibitor is cyclohexylammonium carbonate, diisopropylamine nitrate, or guanidine carbonate and the low vapor pressure volatile corrosion inhibitor is dicyclohexylamine nitrite, dicyclohexylamine chromate or hexamethylenetetraamine.

40. The method of preparing a corrosion-resistant ferromagnetic metal powder as claimed in claim 37, wherein the high vapor pressure volatile corrosion inhibitor is cyclohexylammonium carbonate, diisopropylamine nitrate, or guanidine carbonate and the low vapor pressure volatile corrosion inhibitor is dicyclohexylamine nitrite, dicyclohexylamine chromate or hexamethylenetetraamine.

41. The method of preparing a corrosion resistant ferromagnetic metal powder as claimed in claim 1, wherein said ferromagnetic metal powder comprises the product obtained on thermally decomposing an organic acid salt of a ferromagnetic metal and then reducing the thermal decomposition product with a reducing gas.

42. The method of preparing a corrosion resistant ferromagnetic metal powder as claimed in claim 2, wherein said ferromagnetic metal powder comprises the product obtained on thermally decomposing an organic acid salt of a ferromagnetic metal and then reducing the thermal decomposition product with a reducing gas.

43. The method of preparing a corrosion resistant ferromgnetic metal powder as claimed in claim 3, wherein said ferromagnetic metal powder comprises the product obtained on thermally decomposing an organic acid salt of a ferromagnetic metal and then reducing the thermal decomposition product with a reducing gas.

44. The method of preparing a corrosion-resistant ferromagnetic metal powder as claimed in claim 1, wherein said ferromagnetic metal powder is the product obtained on reducing needle-like iron oxyhydroxides, needle-like iron oxyhydroxides having a metal contained therein or needle-like iron oxides obtained from these hydroxides.

45. The method of preparing a corrosion-resistant ferromagnetic metal powder as claimed in claim 2, wherein said ferromagnetic metal powder is the product obtained on reducing needle-like iron oxyhydroxides, needle-like iron oxyhydroxides having a metal contained therein or needle-like iron oxides obtained from these hydroxides.

46. The method of preparing a corrosion-resistant ferromagnetic metal powder as claimed in claim 3, wherein said ferromagnetic metal powder is the product obtained on reducing needle-like iron oxyhydroxides, needle-like iron oxyhydroxides having a metal contained therein or needle-like iron oxides obtained from these hydroxides.

47. The method of preparing a corrosion-resistant ferromagnetic metal powder as claimed in claim 1, wherein said ferromagnetic metal powder is the product obtained on evaporating a ferromagnetic metal in an inert gas under low pressure.

48. The method of preparing a corrosion-resistant ferromagnetic metal powder as claimed in claim 2, wherein said ferromagnetic metal powder is the product obtained on evaporating a ferromagnetic metal in an inert gas under low pressure.

49. The method of preparing a corrosion-resistant ferromagnetic metal powder as claimed in claim 3, wherein said ferromagnetic metal powder is the product obtained on evaporating a ferromagnetic metal in an inert gas under low pressure.

50. The method of preparing a corrosion-resistant ferromagnetic metal powder as claimed in claim 1, wherein said ferromagnetic metal powder is the product obtained on thermally decomposing a ferromagnetic metal carbonyl compound.

51. The method of preparing a corrosion-resistant ferromagnetic metal powder as claimed in claim 2, wherein said ferromagnetic metal powder is the product obtained on thermally decomposing a ferromagnetic metal carbonyl compound.

52. The method of preparing a corrosion-resistant ferromagnetic metal powder as claimed in claim 3, wherein said ferromagnetic metal powder is the product obtained on thermally decomposing a ferromagnetic metal carbonyl compound.

53. The method of preparing a corrosion-resistant ferromagnetic metal powder as claimed in claim 1, wherein said ferromagnetic metal powder is the product obtained on electrodepositing a ferromagnetic metal powder using a mercury cathode and then separating the ferromagnetic metal powder from the mercury.

54. The method of preparing a corrosion-resistant ferromagnetic metal powder as claimed in claim 2, wherein said ferromagnetic metal powder is the product obtained on electrodepositing a ferromagnetic metal powder using a mercury cathode and then separating the ferromagnetic metal powder from the mercury.

55. The method of preparing a corrosion-resistant ferromagnetic metal powder as claimed in claim 3, wherein said ferromagnetic metal powder is the product obtained on electrodepositing a ferromagnetic metal powder using a mercury cathode and then separating the ferromagnetic metal powder from the mercury.

56. The method of preparing a corrosion-resistant ferromagnetic metal powder as claimed in claim 1, wherein said ferromagnetic metal powder is the product obtained on adding a reducing agent to a solution containing a salt of a ferromagnetic metal to reduce the salt.

57. The method of preparing a corrosion-resistant ferromagnetic metal powder as claimed in claim 2, wherein said ferromagnetic metal powder is the product obtained on adding a reducing agent to a solution containing a salt of a ferromagnetic metal to reduce the salt.

58. The method of preparing a corrosion-resistant ferromagnetic metal powder as claimed in claim 3, wherein said ferromagnetic metal powder is the product obtained on adding a reducing agent to a solution containing a salt of a ferromagnetic metal to reduce the salt.

59. Corrosion-resistant ferromagnetic metal powder characterized in that a volatile corrosion inhibitor is adsorbed on at least a part of the surface of a ferromagnetic metal powder having an average particle size of about 1,000 Å or less, produced by the method as claimed in claim 1.

60. Corrosion-resistant ferromagnetic metal powder characterized in that a volatile corrosion inhibitor is adsorbed on at least a part of the surface of a ferromagnetic metal powder having an average particle size of about 1,000 Å or less, produced by the method as claimed in claim 2.

61. Corrosion-resistant ferromagnetic metal powder characterized in that a volatile corrosion inhibitor is adsorbed on at least a part of the surface of a ferromagnetic metal powder having an average particle size of about 1,000 Å or less, produced by the method as claimed in claim 3.

62. Corrosion-resistant ferromagnetic metal powder produced by the method as claimed in claim 1, in which the ferromagnetic metal powder has an average particle size of 50 to 1,000 Å, wherein each particle comprises at least about 75% by weight of a metal, and said metal contains at least one of Fe, Fe-Co, Fe-Ni, Co-Ni or Fe-Co-Ni as a main component.

63. Corrosion-resistant ferromagnetic metal powder produced by the method as claimed in claim 2, in which the ferromagnetic metal powder has an average particle size of 50 to 1,000 Å, wherein each particle comprises at least about 75% by weight of a metal, and said metal contains at least one of Fe, Fe-Co, Fe-Ni, Co-Ni or Fe-Co-Ni as a main component.

64. Corrosion-resistant ferromagnetic metal powder produced by the method as claimed in claim 3, in which the ferromagnetic metal powder has an average particle size of 50 to 1,000 Å, wherein each particle comprises at least about 75% by weight of a metal, and said metal contains at least one of Fe, Fe-Co, Fe-Ni, Co-Ni or Fe-Co-Ni as a main component.

65. Corrosion-resistant ferromagnetic metal powder produced by the method as claimed in claim 1, in which the volatile corrosion inhibitor is a nitrite of an organic amine.

66. Corrosion-resistant ferromagnetic metal powder produced by the method as claimed in claim 2, in which the volatile corrosion inhibitor is a nitrite of an organic amine.

67. Corrosion-resistant ferromagnetic metal powder produced by the method as claimed in claim 3, in which the volatile corrosion inhibitor is a nitrite of an organic amine.

68. Corrosion-resistant ferromagnetic metal powder as claimed in claim 65, in which the nitrite of an organic amine is dicyclohexylamine nitrite or diisopropylamine nitrite.

69. Corrosion-resistant ferromagnetic metal powder as claimed in claim 66, in which the nitrite of an organic amine is dicyclohexylamine nitrite or diisopropylamine nitrite.

70. Corrosion-resistant ferromagnetic metal powder as claimed in claim 67, in which the nitrite of an organic amine is dicyclohexylamine nitrite or diisopropylamine nitrite.

71. A ferromagnetic metal powder produced by the process as claimed in claim 1.

72. A ferromagnetic metal powder produced by the process as claimed in claim 2.

73. A ferromagnetic metal powder produced by the process as claimed in claim 3.

74. A magnetic recording medium comprising a ferromagnetic metal powder produced by the process as claimed in claim 1.

75. A magnetic recording medium comprising a ferromagnetic metal powder produced by the process as claimed in claim 2.

76. A magnetic recording medium comprising a ferromagnetic metal powder produced by the process as claimed in claim 3.

* * * * *